Oct. 9, 1951 — A. E. MURRAY — 2,570,969
SPRING SUSPENSION
Filed Feb. 28, 1947 — 2 Sheets-Sheet 2
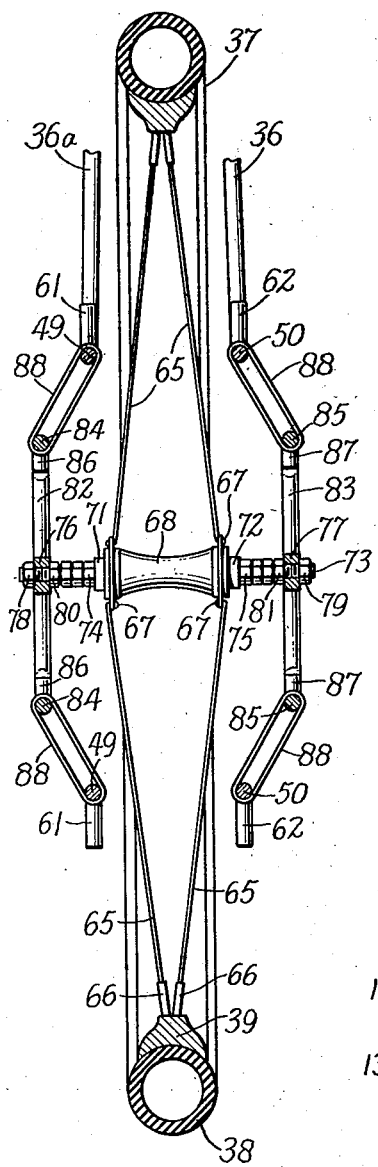
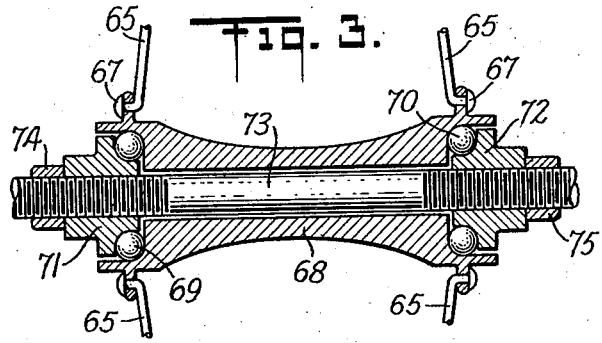
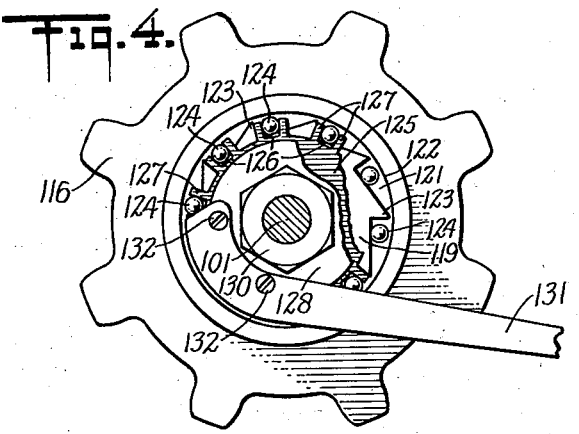
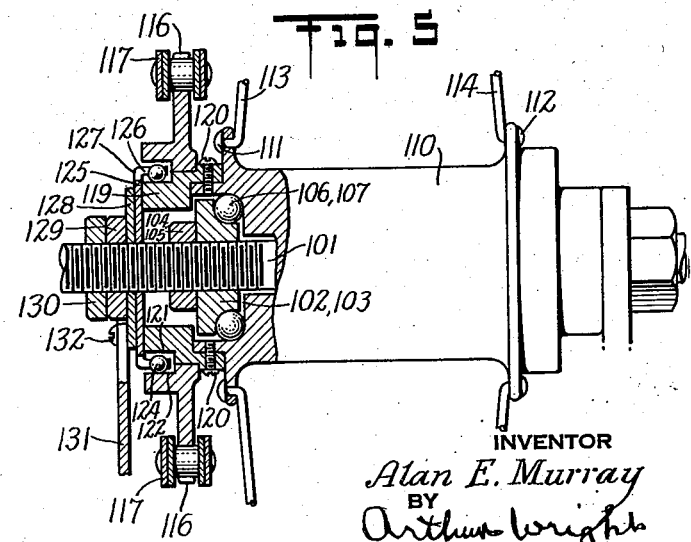
INVENTOR
Alan E. Murray
BY
Arthur Wright
ATTORNEY Patented Oct. 9, 1951

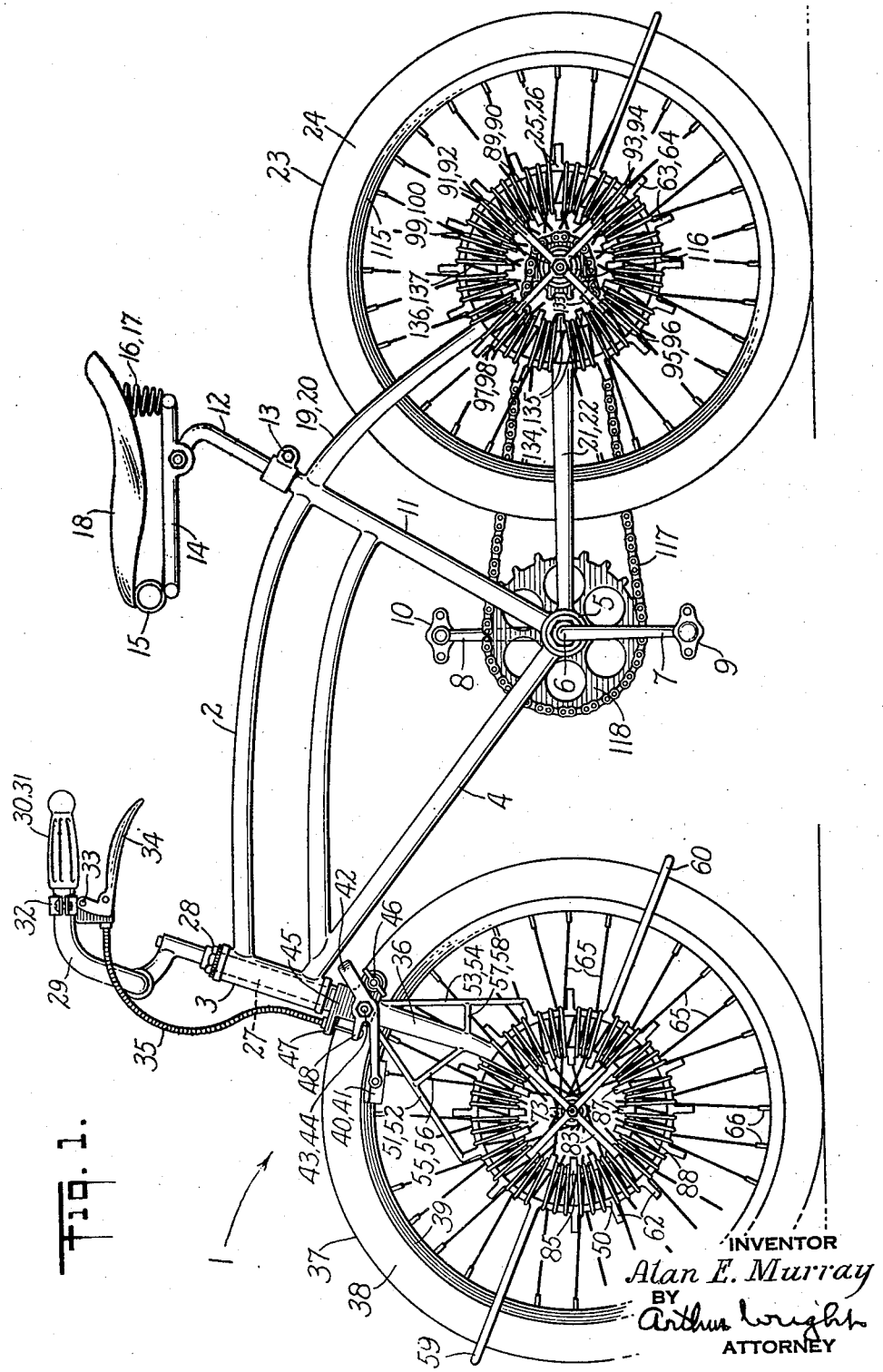

2,570,969

UNITED STATES PATENT OFFICE 2,570,969

SPRING SUSPENSION

Alan E. Murray, New York, N. Y.

Application February 28, 1947, Serial No. 731,622

12 Claims. (Cl. 267—63)

My invention relates particularly to wheels which are capable of being provided for any desired purpose, for example, in connection with bicycles and motive vehicles of all kinds, etc.

The object of my invention is to provide a wheel and the apparatus in which it may be incorporated, by means of which vibrations and shocks are eliminated in the operation thereof, between the driving and driven elements comprised therein. Another object is to provide wheels of this character in which there is a maximum of smoothness in the rotation and operation thereof between the driving and driven means, not only radially but also laterally, that is to say axially in either direction, as well as circumferentially. A further object is to obtain a maximum effective transmission or travel without impedance from either one to the other of the driving and driven means, thus obtaining an ideal smoothness in the operation thereof. A further object is to provide a bicycle, by way of example, in which an ideal smoothness or comfort is attained in riding the same, substantially unimpeded by the unevennesses of the road on which it is traveling. A further object is to accomplish this end by an elastic suspension of the parts, one from another, with the aid of extensible elements or natural or artificial rubber strands, while avoiding relatively movable or chattering metal contacts which might transmit some of the vibrations and shocks encountered. Further objects of my invention will appear from the detailed description of the same hereinafter.

While my invention is capable of embodiment in many different forms, for the purpose of illustration I have shown only one form thereof in the accompanying drawings, in which—

Fig. 1 is a side elevation of a bicycle containing wheels made in accordance with my invention;

Fig. 2 is a vertical transverse section of the front wheel of the bicycle;

Fig. 3 is an enlarged transverse section of the axle and hub of the front wheel shown in Fig. 2;

Fig. 4 is an elevation, partly in section, of the coaster and sprocket used on the rear wheel of the bicycle; and Fig. 5 is a transverse vertical section of the rear wheel hub and coaster.

In the drawings, I have shown a bicycle 1 having the usual truss frame of steel tubing comprising a horizontal frame member 2, an inclined head 3 and a downwardly directed frame member 4 leading to a usual ball bearing cylinder 5, in which a pedal axle 6 is pivoted, carrying cranks 7 and 8 having thereon detachable pedals 9 and 10. An upwardly directed frame member 11 leads from the ball bearing cylinder 5 to be connected to the rear end of the horizontal member 2 and thus provide means for receiving an inclined saddlepost 12 arranged to be fastened in its adjusted position by a nut 13 screw-threaded on an upper split extension of the frame member 11. The saddlepost 12 carries a horizontal saddle support 14 having on the front end thereof an inclined helical spring 15 and on the rear end a pair of helical springs 16 and 17 located side by side, the three springs 15, 16 and 17 carrying thereon the usual leather saddle 18. Leading downwardly and towards the rear there is provided a pair of rear frame members 19 and 20, and leading rearwardly from the cylinder 5 there is the usual pair of horizontal rear frame members 21 and 22. A rear wheel 23, having the usual inflatable pneumatic tire 24, is located between the frame members 19 and 20 and the frame members 21 and 22. Attached to the two left side frame members 19 and 21, by welding or otherwise, there is a rear tubular circular frame 25, and on the opposite side of the bicycle there is a similar rear tubular circular frame member 26 which is also welded to the frame.

At the front of the bicycle, passing downwardly through the head 3, there is the usual pivot stem 27 having received therein in the usual way, by means of a nut 28 on a split tubular end, a tubular handle bar 29 having handles 30 and 31 thereon on opposite sides of the bicycle. The handle 31, furthermore, carries a fixed bracket, or clamp, 32 provided with a pivot screw 33 fastened to a manual brake lever 34 beneath the handle 31, to operate the usual wheel rim brake, hereinafter referred to, by means of a Bowden wire 35. The pivot stem 27 passes downwardly through the head 3 to provide a fork having arms 36, 36a to receive a front wheel 37 having the usual inflatable pneumatic tire 38 on a rim 39. Mounted to bear on opposite sides of the rim 39 there are two braking blocks 40 and 41 which operate in unison by reason of being mounted on a forked lever 42 passing around the rear of the fork arms 36 and 36a above the wheel 37 and having pivotal mountings 43, 44 on a clamping bracket 45 clamped to the two arms 36, 36a of the fork by means of a thumb-screw 46. On the bracket 45 there is a stationary lug 47 to receive therethrough the lower end of the Bowden wire 35 so that the same can pull upon an arm 48 extending above the forked lever 42 to which the Bowden wire 35 is attached. Thus, by moving the Bowden wire 35 rearwardly the lever arm 48 is moved to the left, in Fig. 1, so as to move the brake blocks 40 and 41 upwardly against the rim 39. The two branches 36, 36a of the fork, which are constructed alike, are provided, respectively, with front ring-like weight-bearing circular tubular frames 49 and 50, preferably concentric with the wheel 37, which are welded to the two arms 36, 36a of said fork and which are furthermore provided, respectively, with front and rear braces 51, 52, 53, 54 and cross braces 55, 56, 57, 58. Also welded to the circular frames there are front and rear U-shaped jumpers 59 and 60, going around the front wheel 37, which add strength to the construction and provide a common support for the two circular frame members 49 and 50. Furthermore, each of the said circular front frame members 49 and 50 is provided with any desired number, for instance 16 or more radial projections or hooks 61, 62, although there may be very many more of these hooks, and which may be, preferably, spaced only about ⅛ to ¼" apart peripherally. Similarly, each of the two circular rear frame members 25 and 26 may be provided with any desired number for instance 16 or more such projections or hooks 63, 64, although there may be very many more of these hooks, and which may be, preferably, spaced apart only about ⅛ to ¼" peripherally. The front wheel 37 is constructed with the usual bicycle wheel spokes 65, the outer ends of which are screw-threaded to receive screw-threaded headed nipples 66 which are carried in the usual way within the rim 39. The inner ends of the spokes 65 may have heads 67 received alternately within the two ends of a hub 68, which is supported by balls 69 and 70 resting on cone ball races 71 and 72 screw-threaded on an axle 73 which has lock nuts 74 and 75, also screw-threaded on the axle 73. At its outer ends the screw-threaded axle 73 carries spider hubs 76 and 77 screw-threaded thereon and which are held in place by lock nuts 78, 79, 80 and 81. Each of the hubs 76 and 77 carries, fastened thereto by welding or otherwise, four or more tubular radial arms 82 and 83, to which there are welded tubular inner wheel rings 84 and 85. Each of the wheel supporting rings 84 and 85 has projecting inwardly therefrom any desired number, for instance 16 or more projections or hooks 86, 87, corresponding in position to the respective hooks 61, 62 on the outer circular frames 49 and 50. It will be noted that the circular wheel rings 84 and 85 are spaced farther apart, as shown in Fig. 2, than the front circular frames 49 and 50, to give lateral stability. Between the respective hooks 61, 62, and those of the hooks 86, 87 which are adjacent, respectively, thereto, there are applied thin endless rubber rings 88 of approximately ⅛" in thickness, or of any other desired dimensions, under tension, and there may be one or more such rubber rings 88 to each pair of hooks, if desired. This tension is preferably, however, only a slight tension so that the rubber cord, when applied, is somewhat stretched but not up to a point approximating the elastic limit of the rubber, and this same amount of tension is preferably applied to all of the rubber cord or cords applied throughout in the construction of the said wheels or bicycle, etc., referred to herein, although the said tension may be varied, as desired. Instead of the rubber rings 88, however, I may apply over the hooks 61, 62 and 86, 87, alternately from the wheel rings 84, 85 to the circular frame members 49, 50, as many windings as desired of a rubber cord of the same thickness just referred to, under the said tension, until all of the intervals between the hooks 61, 62 and hooks 86, 87 have been provided with windings. These windings, if desired, can pass between, instead of over, the adjacent hooks, around the circular wheel members 84, 85 and around the circular frame members 61, 62. The two free ends of this rubber cord can then be tied or fastened together in any desired manner, at any desired point on the bicycle frame or on the wheel rings 84, 85.

This provides an effective elastic suspension of rubber or a rubber substitute, under tension, of the front wheel 37 from the bicycle frame, giving, nevertheless, the needed stability vertically as well as forwardly, rearwardly and laterally as well as torsionally. It will be understood that these parts may be so constructed as to provide any desired distance between each of the circular frame members 49, 50 and its corresponding wheel rings 84, 85 on each of the sides of the front wheel 37. Also, it will be understood that each pair of the circular frame members 49, 50 and 84, 85, on each of the sides of the wheel 37, may be located at any radial distance from the center of the wheel, but preferably they are located rather near the periphery of the wheel 37 as this gives much greater stability as well as much greater elasticity for the support of the wheel 37 on the bicycle.

The rear wheel 23 may be constructed similarly to the front wheel 37, so as to support the rear wheel from the circular rear frames 25, 26, which latter may be located at any radial distance from the center of the rear wheel 23, but preferably in such as manner as to be near the periphery of the rear wheel 23, as in the case of the front wheel 37 just referred to. For this purpose the rear wheel is provided with two circular tubular wheel rings 89, 90 which are carried, respectively, on four tubular radial arms 91, 92, 93, 94, 95, 96, 97 and 98, the radial arms 91, 93, 95 and 97 and the arms 92, 94, 96 and 98 being carried, respectively, on internally screw-threaded spider hubs 99, 100, which are screw-threaded to a rear axle 101 having screw-threaded thereon conical ball races 102, 103, held in place by nuts 104, 105, for receiving balls 106, 107 cooperating with ball races 108, 109 in a rear hub 110 which receives heads 111, 112 of spokes 113, 114 connected by screw-threaded nipples, as previously described, passing through a rear wheel rim 115. On the rear hub 110 there is, furthermore, supported a sprocket wheel 116 in any desired manner, which may be connected by a sprocket chain 117 to a front sprocket 118 carried by means of ball bearings (not shown) within the crank cylinder 5, carrying the crank shaft 6, so that the latter is connected to be rotated with the sprocket wheel 118.

The rear sprocket wheel 116 may be secured in any desired manner to the hub 110, but preferably this mounting is such as to include an interposed coaster or free wheeling device of any desired construction. For this purpose, I have shown, diagrammatically, a coaster disc 119 fastened by screws or rivets 120 to one side of the hub 110. The coaster disc 119 has on its periphery a plurality of inclined or tapered pockets 121 extending into an internal annular recess 122 in the sprocket wheel 116. The said pockets 121 have, peripherally located at the ends thereof, terminal projections 123 which extend into said recess 122, and said pockets 121 are provided, also, with a series of freely movable balls 124 to act as a clutch between the inner tapered faces of the pockets 121 and the circular internal surface of the annular sprocket recess 122. A ball cage 125, having recesses 126 to receive the balls 124, is loosely mounted on the periphery of the rear axle 101 so as to require the balls 124 to move in unison whenever they are moved, either by the free wheeling coaster in the rear direction of movement of the sprocket wheel 116 from the pedals 9 and 10, or into clutching engagement by the forward movement of the sprocket wheel 116. It will be noted that for this purpose the ball cage 125 has a plurality of laterally directed peripheral ears 127 which extend laterally into the annular sprocket wheel recess 122 on both sides of each of the balls 124. Also, in order to exert some retarding action against the movement of said balls 124, in either the forward or rearward direction, there may be provided a friction disc 128 exerting a slight friction against the outer face of the ball cage 125, and this friction disc 128 may be supported by lock nuts 129 and 130 on the axle 101 and may, in addition, have an arm 131 secured thereto by screws 132 so that said arm may extend outwardly so as to be fastened in any desired manner to the rear wheel ring 90 by a clip 133 or otherwise, thus providing an adequate and dependable small amount of friction in cooperation with the ball cage 125.

It will be noted that in the case of the rear wheel 23 the wheel rings 89 and 90 are provided with inwardly directed projections or hooks 134, 135 and that these hooks are in substantially the same number and relative position as the hooks 63, 64, and are, as in the case of the hooks 61, 62 and 86, 87 on the front wheel 37, connected together by a succession of endless rubber rings 136, 137, under tension, as in the case of the front wheel 37, passing over the adjacent ones of the said hooks on the respective rear circular frames 25, 26 and wheel rings 89, 90, or, instead, by means of an endless rubber cord, as in the case of the front wheel 37. However, these windings of the rubber cord, either in the form of rings or an endless cord, and which may be duplicated for each pair of said hooks, are more in number and closer together at the rear of the bicycle for a width corresponding to the vertical diameter of the sprocket wheel 116, than they are at the other points around the rear wheel rings 89, 90, in order, thus, to offset the forward pull exerted on the sprocket 116 by the sprocket chain 117.

In the operation of my invention, as exemplified in the bicycle illustrated in the drawings, the bicycle will be ridden or propelled in the usual way, by means of the pedals 9 and 10, so that the sprocket chain 117 rotates the rear sprocket wheel 116 so as to cause the balls 124 to ride towards the upper ends of the tapered pockets 121 and, thus, tightly engage the clutch ring 119 and drive the bicycle forwardly. However, coasting can be effected in riding the bicycle by a rearwardly rotary motion of the cranks 7 and 8 to a slight extent so as to free the balls 124 from engagement with the clutch wheel 119. Braking may be effected whenever desired, by operating the brake lever 124 so as to pull the Bowden wire 35 rearwardly, thus moving the brake arm 48 on the brake lever 42 so as to exert frictional contact between the brake blocks 40, 41 with the face of the rim 39 of the front wheel 37. Throughout the riding of the bicycle it will be seen that the suspension of the rider from both the front wheel and the rear wheel is effected merely by the extension of the elastic rubber or rubber substitute, such for instance as neoprene, which is at all times under tension on the frame of the bicycle from the weight of the rider, so that the rider is suspended thereby, without any metal contacts, vertically, forwardly, rearwardly and laterally, as well as torsionally, at all times. Therefore, the rider is substantially entirely freed from the usual vibrations and shocks ordinarily transmitted from the road bed to the rider, and from the discomfort arising therefrom, which at times is very great. Also, this aids in maintaining the momentum of the bicycle. Accordingly, very much smoother riding is accomplished and the bicycle may be driven by the rider with a correspondingly lessened degree of effort, making it more enjoyable and effective as a vehicle for all purposes.

While I have described my invention above in detail I wish it to be understood that many changes may be made therein without departing from the spirit of the same.

I claim:

1. A spring suspension provided with a frame supporting a wheel for rotation on a horizontal axis, an axle on which the wheel is rotatably mounted, a pair of wheel members located on said axle, and a pair of ring-like weight-bearing means supported on said frame, having connected to said means and to the wheel members a series of radially extensible elastic suspension elements distributed circumferentially around said means and the wheel members by being secured to said members, said suspension elements being constructed to be elongated and stretched by increase of the force applied thereto.

2. A spring suspension provided with a frame supporting a wheel for rotation on a horizontal axis, an axle on which the wheel is rotatably mounted, a pair of wheel rings located on said axle, and ring-like weight-bearing means supported on said frame, having connected to said means and to the wheel rings a series of radially extensible elastic suspension elements surrounding the axle, the said elastic elements being secured to said wheel rings and constructed to be elongated and stretched by increase of the force applied thereto.

3. A spring suspension provided with a frame supporting a wheel for rotation on a horizontal axis, an axle on which the wheel is rotatably mounted, a pair of wheel rings located on said axle, and ring-like weight-bearing means supported on said frame, having connected to said means and to the wheel rings a series of radial strands of rubber-like elastic material on which the axle is floated free from said frame, constructed to be elongated and stretched by increase of force applied thereto, said wheel rings and ring-like means having peripheral projections between which said strands are located.

4. A spring suspension provided with a frame supporting a wheel for rotation on a horizontal axis, an axle on which the wheel is rotatably mounted, a pair of wheel rings located on said axle, and ring-like weight-bearing means supported on said frame, having connected to said means and to the wheel rings a series of radial strands of rubber-like elastic material on which the axle is floated free from said frame, the said elastic strands being secured around said wheel ring, the elastic strands being constructed to be elongated and stretched by increase of the force applied thereto, said wheel rings and ring-like means having peripheral projections between which said strands are located.

5. A spring suspension provided with a frame supporting a wheel for rotation on a horizontal axis, an axle on which the wheel is rotatably mounted, a pair of wheel members located on said axle, and ring-like weight-bearing means supported on said frame, having connected to said means and to the wheel members a series of radial strands of rubber-like elastic material on which the axle is floated free from said frame, constructed to be elongated and stretched by increase of the force applied thereto, said wheel rings and ring-like means having peripheral projections between which said strands are located, and said strands being in the form of a succession of closed rings.

6. A spring suspension provided with a frame supporting a wheel for rotation on a horizontal axis, an axle on which the wheel is rotatably mounted, a pair of wheel rings located on said axle, and ring-like weight-bearing means supported on said frame, having connected to said means and to the wheel rings a series of radial strands of rubber-like elastic material on which the axle is floated free from said frame, the elastic strands being constructed to be elongated and stretched by increase of the force applied thereto, said wheel rings and ring-like means having peripheral projections between which said strands are located, and said strands being in the form of a succession of closed rings.

7. A spring suspension provided with a frame supporting a wheel for rotation on a horizontal axis, an axle on which the wheel is rotatably mounted, a pair of wheel members located on said axle, and ring-like weight-bearing means supported on said frame, having connected to said means and to the wheel members a series of radial strands of rubber-like elastic material on which the axle is floated free from said frame, constructed to be elongated and stretched by increase of the force applied thereto, said wheel rings and ring-like means having peripheral projections between which said strands are located, and said strands being in the form of a succession of windings of a rubber-like cord having ends.

8. A spring suspension provided with a frame supporting a wheel for rotation on a horizontal axis, an axle on which the wheel is rotatably mounted, a pair of wheel rings located on said axle, and ring-like weight-bearing means supported on said frame, having connected to said means and to the wheel rings a series of radial strands of rubber-like elastic material on which the axle is floated free from said frame, the said elastic strands being constructed to be elongated and stretched by increase of the force applied thereto, said wheel rings and ring-like means having peripheral projections between which said strands are located, and said strands being in the form of a succession of windings of a rubber-like cord having ends.

9. A spring suspension provided with a frame supporting a wheel for rotation on a horizontal axis, a hub provided with an axle on which the wheel is rotatably mounted, a pair of wheel members located on said axle, and ring-like weight-bearing means supported on said frame, having connected to said means and to the wheel members a series of radial strands of rubber-like elastic material on which the axle is floated free from said frame by being secured to said members, constructed to be elongated and stretched by increase of the force applied thereto, one of said ring-like weight-bearing means being provided on each side of the wheel.

10. A spring suspension provided with a frame supporting a wheel for rotation on a horizontal axis, a hub provided with an axle on which the wheel is rotatably mounted, a pair of wheel rings located on said axle, and ring-like weight-bearing means supported on said frame, having connected to said means and to the wheel rings a series of radial strands of rubber-like elastic material on which the axle is floated free from said frame, the said elastic strands being secured around said wheel rings, the elastic strands being constructed to be elongated and stretched by increase of the force applied thereto, one of said ring-like weight-bearing means being provided on each side of the wheel and one of said wheel rings being provided on each side of the hub and the wheel rings being located farther from the plane of the wheel than the ring-like weight-bearing means.

11. A spring suspension provided with a frame supporting a wheel for rotation on a horizontal axis, an axle on which the wheel is rotatably mounted, a pair of wheel rings located on the axle, and a pair of circular weight-bearing means located on said frame and supported on said frame, having connected to said means and to the wheel rings a series of radially extensible elastic suspension cords surrounding the axle, said suspension cord being constructed to be elongated and stretched by increase of the force applied thereto.

12. A spring suspension provided with a frame supporting a wheel for rotation on a horizontal axis, an axle on which the wheel is rotatably mounted, a pair of wheel rings located on the axle, and a pair of circular weight-bearing means located on said frame and supported on said frame, having connected to said means and to the wheel rings a series of radially extensible elastic suspension cords surrounding the axle, said suspension cords being constructed to be elongated and stretched by increase of the force applied thereto, the entire support of the axle from said frame being by means of said elastic cords.

ALAN E. MURRAY.

REFERENCES CITED

The following references are of record in the file of this patent:

UNITED STATES PATENTS

| Number | Name | Date |
|---|---|---|
| Re. 15,656 | Roche | July 17, 1923 |
| 455,864 | Cornelius | July 14, 1891 |
| 482,175 | Hollafolla | Sept. 6, 1892 |
| 619,408 | Heany | Feb. 14, 1899 |
| 622,044 | Heath | Mar. 28, 1899 |
| 649,668 | Minogue | May 15, 1900 |
| 658,552 | Mathey | Sept. 6, 1900 |
| 796,625 | Bernat | Aug. 8, 1905 |
| 920,999 | Rice | May 11, 1909 |
| 1,546,500 | Martin | July 21, 1925 |
| 1,717,548 | Berg | June 18, 1929 |

FOREIGN PATENTS

| Number | Country | Date |
|---|---|---|
| 20,421 | Great Britain | 1892 |
| 15,356 | Great Britain | 1897 |
| 304,841 | Italy | Jan. 19, 1933 |